June 8, 1971    R. G. MARTZ    3,584,101

METHOD FOR MAKING LIP-TYPE ROTARY SHAFT SEALS

Filed Oct. 8, 1968

INVENTOR
ROGER G. MARTZ

By Norton Lesser
ATTORNEY

United States Patent Office 3,584,101
Patented June 8, 1971

3,584,101
METHOD FOR MAKING LIP-TYPE ROTARY SHAFT SEALS
Roger G. Martz, Lebanon, Ind., assignor to Stewart-Warner Corporation, Chicago, Ill.
Filed Oct. 8, 1968, Ser. No. 765,923
Int. Cl. B29b 3/06; B28b 1/48; B29c 17/08; B29d 19/08
U.S. Cl. 264—155
2 Claims

ABSTRACT OF THE DISCLOSURE

The following specification describes a method and apparatus for making a rotary seal for a rotary shaft by seating a blank in a bearing groove with the stresses equalized by rotating crowned tools against opposite surfaces of the blank, and then cutting the blank with a piloted cutter to the size of the shaft fitted into the bearing.

FIELD OF THE INVENTION

This invention relates in general to rotary seals and more particularly to a method and apparatus for accurately fitting and sizing a packing ring or seal ring for use as a rotary shaft seal.

Dimensions of packing or seal rings are subject to considerable variation. For example, a molded ring of nominal 1/8" section may vary between .135" and .143" in section and a nominal inner diameter of 3/4" may actually vary between .728" to .740". These variations, coupled with variations in the bearing grooves or shafts with which the rings are used for rotary seals, creates early failure or incomplete sealing.

SUMMARY OF THE INVENTION

The present invention solves the above problems by first cutting a blank from stock of uniform and selected thickness, fitting the blank to the bearing groove and then cutting the blank to the shaft size. For fitting or seating the blank in the bearing groove, a pair of crowned tools rotated in opposite directions are applied under axial pressure to the respective surfaces of the blank. A cutting tool piloted in the bearing opening cuts the packing ring or seal ring to the shaft size.

It is therefore among the objects of the present invention to provide an improved method and apparatus for seating and sizing a packing ring or seal ring for use with a rotary shaft.

Other objects and features of the present invention will become apparent on examination of the following specification and claims together with the drawings.

DESCRIPTION OF THE PREFERRED EMBODIMENT

Figure 1:
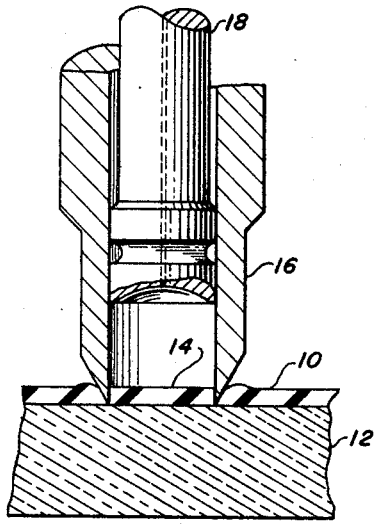
FIG. 1 illustrates a device similar to a paper drill for cutting a rotary seal blank from a sheet of appropriate material.

Referring now to FIG. 1 a typical material for use as a rotary seal is indicated by a sheet 10 of selected and uniform thickness. The sheet 10 is simply palced on a relatively soft block 12 and a blank 14 in the form of a disc is cut from the sheet by a typical paper drill comprising a cutting element 16 and a guide 18 therefor.

Figure 2:
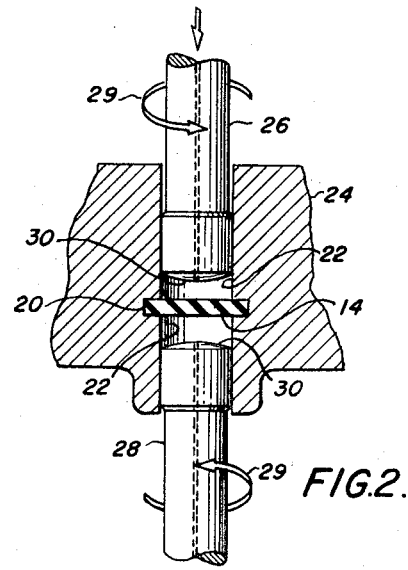
FIG. 2 illustrates the tools and method used for equalizing the stress on the blank and properly seating the blank in a bearing groove.
Figure 3:
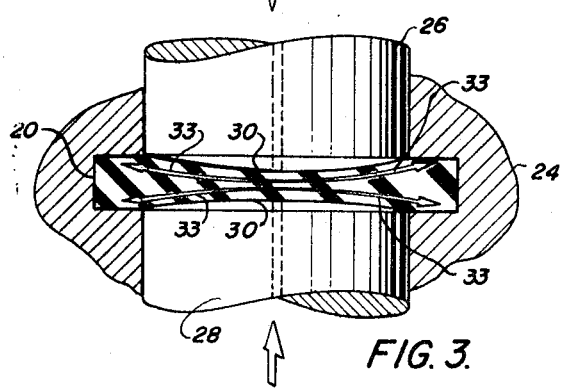
FIG. 3 is an enlarged fragmentary view illustrating the relationship of the stress distribution tools on the blank.
Figure 4:
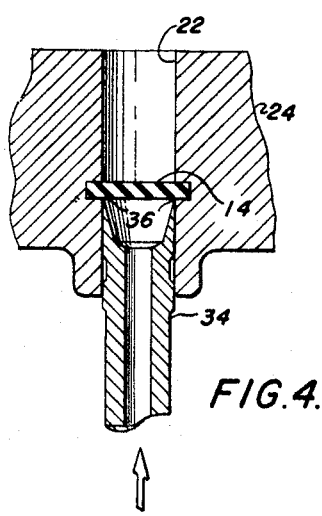
FIG. 4 illustrates the apparatus and method for cutting the blank to the shaft size.

The blank 14 is inserted in a groove 20, which is conventionally formed in the periphery of a shaft receiving passageway 22. The passageway 22 is located in a one piece bearing block 24 as seen in FIG. 2. Tools 26 and 28 each having a crowned end 30 are inserted in respective ends of passageway 22 and engaged under some axial pressure against respective faces of blank or disc 14. The tools 26 and 28 are rotated in opposite directions, as indicated by arrows 29, to place the blank 14 under radial and axial pressure. This ensures that the blank 14 is completely seated in the groove 20 as indicated by the arrowheads 33 in FIG. 3, and that the stresses thereon are properly distributed.

Thereafter, a cutting tool 34 having a circular cutting edge 36 conforming to the size of the shaft, is inserted in passageway 22. The tool 34 has an outer diameter conforming to the diameter of passageway 22 and is piloted thereby to cut a disc conforming to the diameter of the shaft from the blank 14. This leaves a seal ring having an internal diameter concentric with the passageway and shaft and exactly as required for sealing the shaft in the passageway 22.

The inventive concepts in the foregoing description of an improved method and apparatus for forming a seal ring to be used as a rotary shaft seal are believed set forth in the accompanying claims.

What is claimed is:

1. The method of forming a rotary plastic seal for a rotary shaft adapted to rotate in a bearing passageway formed in a one-piece block and having a groove for receiving a ring comprising the steps of cutting a disc from a plastic sheet of selected and uniform thickness, inserting said disc into said passageway and aligning said disc with said groove, applying axial pressure in a respective opposing direction against opposite faces of said disc and simultaneously applying radial outward pressure in a respective opposing direction against opposite faces of said disc to plastically deform said disc into said groove under equalized stress, and thereafter piloting a tool in said passageway for cutting an opening in said disc conforming to the diameter of said shaft.

2. The method claimed in claim 1 in which said axial and radial pressure in a respective opposing direction is applied through rotation in opposite directions of a pair of facing crowned surfaces moved axially in opposite directions toward a respective disc face.

References Cited

UNITED STATES PATENTS

| | | | |
|---|---|---|---|
| 2,421,105 | 5/1947 | Warren | 264—249X |
| 2,976,575 | 3/1961 | Daubenberger | 264—68 |
| 3,045,287 | 7/1962 | Yost et al. | 264—68 |
| 3,059,898 | 10/1962 | Carlson et al. | |

FOREIGN PATENTS 505,815  12/1954  Italy.

CHARLIE T. MOON, Primary Examiner

U.S. Cl. X.R.

29—445, 522; 264—249, 269; 277—1